April 21, 1942.　　　D. H. FINKLE　　　2,280,403
CLAMP
Filed Jan. 20, 1942
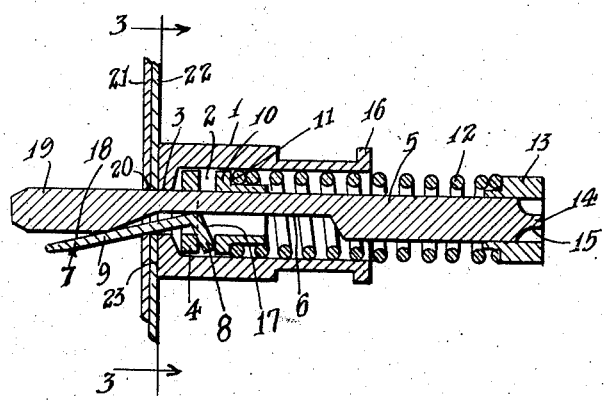
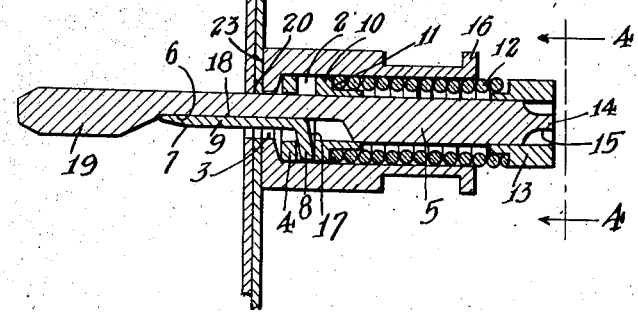
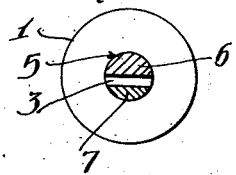
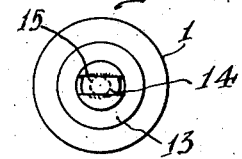
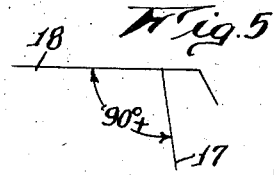
Inventor
Donald H. Finkle
By Lyon & Lyon
Attorneys Patented Apr. 21, 1942

2,280,403

UNITED STATES PATENT OFFICE 2,280,403

CLAMP

Donald H. Finkle, Los Angeles, Calif.

Application January 20, 1942, Serial No. 427,435

8 Claims. (Cl. 85—5)

This invention relates to a clamp and more particularly to a clamp for insertion through rivet holes in two or more sheets of metal to clamp firmly said sheets and to coaxially align said holes.

There have been other clamps for the same purposes, however; the other clamps require either carefully machined parts to fit tightly in the holes, or rely upon spring tension of the aligning members to align the holes. In the smaller size rivet holes the aligning members of the latter class of clamp are very small and they soon lose their tensile strength and become distorted. The class of clamps which have carefully machined parts and which do not rely upon the tensile strength of the aligning members must be inserted and removed from the rivet holes by twisting sideways, as these clamps all have a projection on one side for engaging the back side of the inner sheet of material. This twisting is objectionable because it often results in dents in the material to be riveted.

It is therefore an object of my invention to produce a clamp for aligning rivet holes which does not have to be accurately machined to fit said holes and which does not rely on the tensile strength of the aligning members.

Another object of this invention is to provide a clamp for aligning rivet holes which can be inserted or withdrawn by a straight movement and without twisting the clamp.

Other objects and advantages of my invention will be apparent from the following description of the preferred embodiment thereof, as illustrated in the accompanying drawing.

In the drawing:

Figure 1 is a cross section of my clamp, shown in clamping position.

Figure 2 is a cross section in position for insertion in a rivet hole.

Figure 3 is a cross section taken on the line 3—3 of Figure 1.

Figure 4 is a plan view taken on the line 4—4 of Figure 2.

Figure 5 is a descriptive diagram showing the angle of the finger.

A clamp constructed in accordance with my invention comprises a body 1 having a central bore 2 and a smaller circular bore 3. Into the bore 2 is inserted a washer 4. A rod 5 comprises one of the hole-aligning members and runs through the bores 2 and 3 and has a ground-off flat 6 which cooperates with the flatted finger 7. The flatted finger 7 is inserted through the body 1 and is of such size that when resting in the flat 6 of rod 5, the finger 7 and rod 5 are of smaller diameter than the rivet holes to be aligned.

To maintain the finger 7 in the body, it is provided with an extension 8. It should be noted that the bore 3 is of sufficient size to allow the finger 7 to rotate around the point where the extension 8 and the main portion 9 of the finger 7 join with the washer 4 as a bearing point.

A bushing 10 is slidably mounted on the rod 5 and has a shoulder 11 against which a spring 12 presses. The bushing 10 bears against the extension 8 of the finger 7.

To maintain the spring 12 a cap 13 is held on the rod 5 by peening over the extension 14 after passing it through the hole 15.

In the operation of my clamp, a tool such as a pair of pliers is used to compress the spring 12 by exerting pressure on the cap 13 and the flange 16 on the body 1. When the spring 12 is compressed, the rod 5 is forced out of the body 1 and permits the finger 7 to be forced into the ground-off portion of the rod 5 by the pressure of the spring 12 exerted through the bushing 10 on the extension 8, causing a rotation on the washer 4. An important element of my invention lies in the discovery that the angle made by the face 17 of the extension 8 and the flat face 18 of the main portion 9 of the finger 7 is slightly greater than a 90° angle. By making this angle greater than 90° the force exerted on the extension 8 causes the finger to fit tightly against the rod 5 and the rod and finger can then be inserted in the rivet holes 20 in the sheets 21 and 22 of the material to be clamped. Upon release of the pressure of the pliers the spring 12 draws in the rod 5 and finger 7 rides out on the full section 19, spreading the combined diameter of the rod and finger to one larger than the holes 20, thus aligning them. The spring 12 exerts tension between the face 23 and a wedge formed by the rod 5 and the finger 7 to securely clamp the sheets 21 and 22 together.

A feature of my invention that should be noted is that when the clamp is extended for insertion through rivet holes as shown in Figure 2, the rod 5 and finger 7 do not have any projections common in the art which prevent a straight insertion into the rivet holes. No twisting or tipping to insert is necessary. Also both the rod 5 and finger 7 are made of non-flexible metal and are therefore not worn out or deformed by use, as is the result of other clamps which have flexible fingers or rods.

While I have described the preferred embodiment of my invention, I am not limited thereby except as set forth in the appended claims.

I claim:

1. A clamp for aligning rivet holes in two or more sheets of material comprising a body, a rod longitudinally movable in said body and extending beyond an end thereof, a finger pivotally mounted in and extending through said body beyond said end thereof, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes.

2. A clamp for aligning rivet holes in two or more sheets of material comprising a body, a rod longitudinally movable in said body and extending beyond an end thereof, a finger pivotally mounted in and extending through said body beyond said end thereof, the combined diameter of said rod and said finger being less than the diameter of the rivet holes in said sheets, the protruding end of said rod extending beyond the protruding end of said finger and being of greater cross-sectional size than the remainder of said rod, tension means for moving said rod longitudinally in said body and normally causing contact between the extensions of said rod and finger and clamping action of the protruding ends of said rod and finger against the walls of said rivet holes.

3. In a clamp, a body, a rod longitudinally movable in said body, a finger longitudinally and pivotally mounted in said body and of such size that the combined diameter of said rod and finger are less than the size of rivet holes to be aligned, a projection on said rod, tension means for moving said rod longitudinally in said body and normally causing contact between said finger and said projection and clamping said rod against the walls of said rivet holes.

4. A clamp for aligning rivet holes in two or more sheets of material comprising a body, a rod longitudinally movable in said body and extending beyond an end thereof, a finger pivotally mounted in and extending through said body beyond said end thereof, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes, said contact between said finger and said projection pivoting said finger and forming a wedge, said wedge and the adjacent face of said body forming a clamp for both sides of said sheets.

5. A clamp for aligning rivet holes in two or more sheets of material comprising a body, a non-flexible rod longitudinally movable in said body and extending beyond an end thereof, a non-flexible finger pivotally mounted in and extending through said body beyond said end thereof, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes.

6. A clamp for aligning rivet holes in two or more sheets of material comprising a body, a non-flexible rod longitudinally movable in said body and extending beyond an end thereof, a non-flexible finger pivotally mounted in and extending through said body beyond said end thereof, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes, said contact between said finger and said projection pivoting said finger and forming a wedge, said wedge and the adjacent face of said body forming a clamp for both sides of said sheets.

7. A clamp for aligning rivet holes in two or more sheets of material comprising a body, a rod longitudinally movable in said body and extending beyond an end thereof, a flatted section on said rod, a finger pivotally mounted in and extending through said body beyond said end thereof and having a flatted side thereon for cooperating with said flatted section, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes.

8. A clamp for aligning rivet holes in two or more sheets of material comprising a body, a rod longitudinally movable in said body and extending beyond an end thereof, a flatted section on said rod, a finger pivotally mounted in and extending through said body beyond said end thereof and having a flatted side thereon for cooperating with said flatted section, the combined diameter of said rod and said finger being less than the diameter of the rivet holes in said sheets, the protruding end of said rod extending beyond the protruding end of said finger and having a projection thereon, tension means for moving said rod longitudinally in said body and normally causing contact between said finger and said projection and clamping said rod and said finger against the walls of said rivet holes, said contact between said finger and said projection pivoting said finger and forming a wedge, said wedge and the adjacent face of said body forming a clamp for both sides of said sheets.

DONALD H. FINKLE.